United States Patent [19]
Fujita

[11] 3,723,638
[45] Mar. 27, 1973

[54] COLOR VIDEO SIGNAL RECORDING AND REPRODUCING SYSTEM

[75] Inventor: Mitsuo Fujita, Tokyo, Japan

[73] Assignee: Victor Company of Japan, Limited, Yokohama City, Japan

[22] Filed: Feb. 18, 1970

[21] Appl. No.: 12,301

[30] Foreign Application Priority Data

Feb. 21, 1970 Japan ................................45/12554

[52] U.S. Cl...............................................178/5.4 CD
[51] Int. Cl.............................H04n 9/02, H04n 5/78
[58] Field of Search....178/5.2 R, 5.2 A, 5.4 CR, 5.4 CD,
178/6.6 A; 331/11

[56] References Cited

UNITED STATES PATENTS

| | | | |
|---|---|---|---|
| R26,412 | 6/1968 | Dolby et al. | 178/5.4 |
| 3,359,364 | 12/1967 | Kihara | 178/5.4 |
| 3,312,780 | 4/1967 | Hurst et al. | 178/5.4 |
| 3,507,983 | 4/1970 | Leman | 178/5.4 |
| 3,040,125 | 6/1962 | Dillenburger et al. | 178/6.6 |
| 3,084,224 | 4/1963 | Sanford | 178/6.6 |
| 2,921,976 | 1/1960 | Johnson | 178/6.6 |
| 3,241,084 | 3/1966 | Klingberg | 331/11 |
| 3,528,026 | 9/1970 | Groendycke | 331/11 |

*Primary Examiner*—Richard Murray
*Attorney*—Louis Bernat

[57] ABSTRACT

The invention provides a color video signal recording and reproducing system in which a luminance signal of a color video signal is frequency modulated. A carrier chroma signal is frequency converted, its frequency band is reduced to a low level. The frequency modulated luminance signal and frequency converted carrier chroma signal are then superimposed one on the other and applied to rotary magnetic heads of the video tape recorder. The frequency converted carrier chroma signal and frequency modulated luminance signal are separated from the signal reproduced from the magnetic medium. The frequency modulated luminance signal is then frequency demodulated to provide a luminance signal. The carrier chroma signal is frequency converted to provide a carrier chroma signal from which a timing axis variation is removed. The information on the timing axis variation is obtained from the color burst signal or horizontal synchronizing signal.

5 Claims, 11 Drawing Figures

INVENTOR
MITSUO FUJITA
BY [signature]
ATTORNEY

INVENTOR
MITSUO FUJITA
BY [signature]
ATTORNEY

INVENTOR

MITSUO FUJITA

BY [signature]

ATTORNEY

COLOR VIDEO SIGNAL RECORDING AND REPRODUCING SYSTEM

This invention relates to color video signal recording and reproducing systems, and more particularly, to color video recording and reproducing systems using a simple type video tape recorder which operates without distortions due to beats.

Generally, color video signal recording and reproducing systems are classified into (1) systems wherein the luminance signal and chroma signal are recorded and reproduced in separate tracks on the magnetic medium, and (2) systems wherein the color video signal is frequency modulated and recorded and reproduced.

The first system has an essential disadvantage since it uses twice as much magnetic tape. The second system has a disadvantage when a simple type video tape recorder uses a relatively low and narrow frequency band, since beats are liable to be produced. These beats cause moires and degrade the quality of the reproduced.

To overcome the problems resulting from a production of beats when the second system is used for color-TV broadcasting, a high band system is employed. The FM carrier wave has a frequency which is higher than in the frequency of the low band system.

However, the relative speeds of the magnetic heads and the magnetic tape of a simple video tape recorder used generally in industrial application of color television are low. As a result pronounced beats are often caused by the FM carrier wave and chroma subcarrier wave.

The following factors are responsible for the production of beats. (1) There is a leaking of the frequency modulated component through the frequency modulator. (2) There is a leaking of the frequency modulated component through the frequency demodulator. (3) There is a folded spectrum in the second side band wave with respect to the chroma subcarrier wave. (4) There is a non-linear characteristic of the low carrier wave FM transmission system. Of these, the fourth factor is responsible for the beats inevitably produced during the process of operation of the magnetic tape. Thus, it is impossible to wholly eliminate the beats of this type. However, it is not impossible to eliminate the beats caused by the factors (1) to (3) since they result from low carrier wave frequency modulation of video signals comprising carrier chroma signals.

The present invention is directed to avoidance of the aforementioned disadvantage by frequency modulating the luminance signal and by directly recording the carrier chroma signal.

Accordingly, an object of the invention is to provide a color video signal recording and reproducing system. Here, an object is to satisfactorily record and reproduce color video signals by using a simple type of video tape recorder, and more particularly to avoid distortions due to beats.

Another object of the invention is to provide a color video signal recording and reproducing system which enables a correction of a large variation in the timing axis of a reproduced carrier chroma signal.

A further object of the invention is to provide a color video signal recording and reproducing system which stablizes the phase of a reproduced carrier chroma signal, and more particularly to so stabilize such a phase in a simple type video tape recorder which tends to cause a great variation in the timing axis of the signal.

Still another object of the invention is to provide a color video signal recording and reproducing system which minimizes differential gain and differential phase by separating the carrier chroma signal from the luminance signal.

Additional objects as well as features and advantages of the invention will become more evident from the description set forth hereinafter when considered in conjunction with the accompanying drawings, in which.

Figure 1:
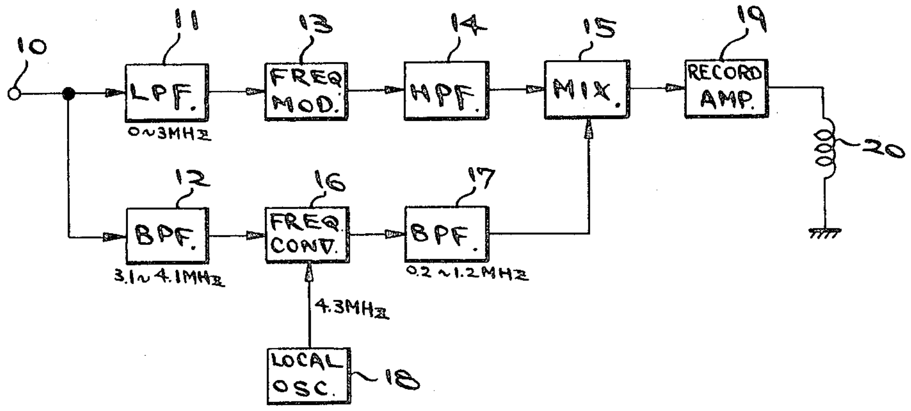
FIG. 1 is a block diagram of one embodiment of the recording side of a system constructed according to this invention.
Figure 5A:
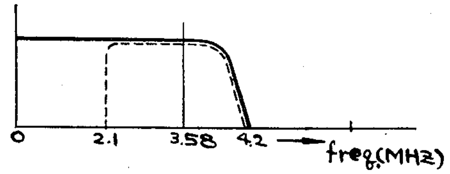
FIGS. 5A to 5G are views showing the spectra of signals produced on the recording side and reproducing side of systems constructed according to this invention.

One embodiment of the recording side of a system constructed according to this invention will be explained with reference to FIG. 1. Here, an NTSC system color video signal (FIG. 5A) for example, is introduced through an input terminal 10 and applied to a low-pass filter 11 having upper limit frequency of 3 $MH_z$. The input is also applied to a band-pass filter 12 which passes the frequency band 3.1 to 4.1 $MH_z$.

A luminance signal (FIG. 5B) for example, is separated from the incoming color video signal at the low-pass filter 11 and thereafter is frequency modulated at a frequency modulator 13. At this time, the frequency deviation is selected to be about 3.5 to 4.5 $MH_z$. The output of the frequency modulator 13 is applied to a high-pass filter 14, which removes therefrom the side band waves of below 1.2 $MH_z$. The frequency modulated signal from filter 14 (FIG. 5C) is applied to a mixer 15.

On the other hand, a carrier chroma signal (FIG. 5D) is separated from the incoming color video signal at the band-pass filter 12, and thereafter is supplied to a frequency converter 16. There it is frequency converted by the output signal (of about 4.3 $MH_z$, for example) of a local oscillator 18. Then, the frequency conversion is supplied to a band-pass filter 17 of the frequency band 0.2 to 1.2 $MH_z$. Unnecessary components are removed from the output signal of the frequency converter 16 at the band-pass filter 17. This produces a carrier chroma signal of the frequency band 0.2 to 1.2 $MH_z$ (FIG. 5E) which is supplied to the mixer 15.

Figure 5B:
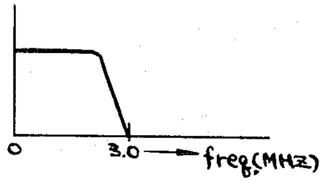
Figure 5C:
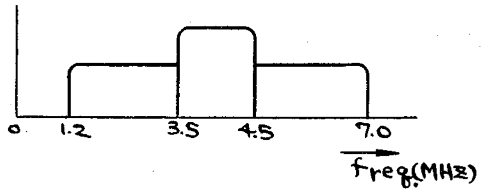
Figure 5D:
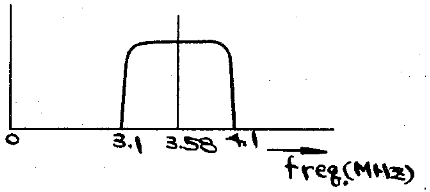
Figure 5E:
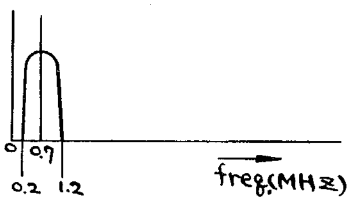
Figure 5F:
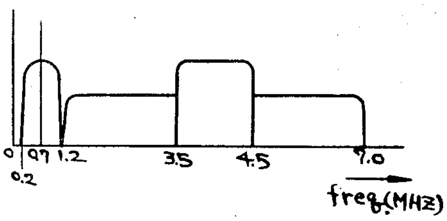

In the mixer 15, the frequency modulated signal from the high-pass filter 15 and the carrier chroma signal from the band-pass filter 17 are superimposed one on the other to produce a signal as shown in FIG. 5F. This signal is then amplified at a recording amplifier 19 and applied to rotary magnetic recording and reproducing heads 20, for example. This head may be part of any well known video tape recorder. The signal is thus recorded by the rotating magnetic heads 20 on a moving magnetic tape.

The video tape recorder used in the embodiments of this invention may include the two head helical scan system. In this type of system, the magnetic tape is brought into contact with and moved obliquely about the other circumferential surface of a guide drum. The tape wraps circumferentially about approximately 180° of the guide drum. The two magnetic recording and reproducing heads are mounted on the peripheral edge of a rotary member, in positions diametrically opposed to each other. This rotary member is interposed between upper and lower portions of the guide drum. As a result, a video is recorded on and reproduced from the magnetic tape in tracks which lie obliquely, with respect to the longitudinal axis of the tape.

During a first one-half revolution of the rotary member, one of the magnetic heads records or reproduces one field or one frame of the video signal in one linear track which is disposed obliquely relative to the longitudinal direction of the tape. During a second one-half revolution of the rotary member, the other magnetic head records or reproduces the next field or frame in a linear track disposed parallel to the preceding track. This process is repeated to record or reproduce video signals, as desired.

Figure 2:
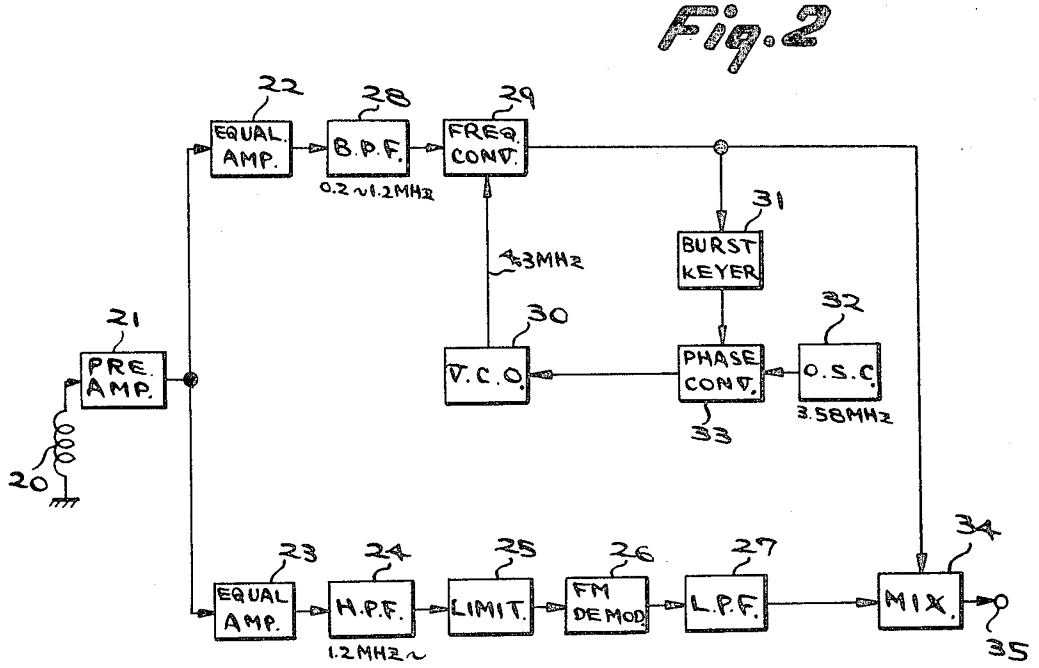
FIG. 2 is a block diagram of one embodiment of the reproducing side of a system constructed according to this invention.

A first embodiment of the reproducing side of a system constructed according to this invention is shown in FIG. 2. A signal reproduced by the rotary magnetic recording and reproducing heads 20 is amplified at a preamplifier 21. FIG. 5F shows the output signal from the preamplifier 21. This amplified signal is then supplied to equalizing amplifiers 22 and 23. The output signal subjected to equalization of frequency from the equalizing amplifier 23 is supplied to a high-pass filter 24. There a frequency modulated signal (FIG. 5C) is separated from the signal and applied to a limiter 25, where it is amplitude limited. Then, the frequency modulated signal is demodulated at a frequency demodulator 26. The frequency modulated carrier wave components are removed at a low-pass filter 27, to produce a luminance signal (FIG. 5B).

A carrier chroma signal of 0.2 to 1.2 $MH_z$ (FIG. 5E) is separated at a band-pass filter 28, coupled to the output of the other equalizing amplifier 22. The separated carrier chroma signal is then applied to a frequency converter 29, where it is converted by the output signal of a voltage control oscillator 30, having a center frequency of about 4.3 $MH_z$. Thus, the separated carrier chroma signal is restored to the original carrier chroma signal having a subcarrier wave of 3.58 $MH_z$ (FIG. 5D).

Then, the output of the frequency converter 29 is supplied to a burst keyer 31. A color burst signal is keyed and supplied to a phase comparator 33. This circuit compares the phase of the burst signal with the phase of the output signal of 3.58 $MH_z$ of a reference subcarrier oscillator 32. The oscillation frequency of the voltage control oscillator 30 is controlled by the output voltage of the phase comparator 33, which represents a detected phase error.

Thus, the frequency converter 29, burst keyer 31, phase comparator 33, voltage control oscillator 30 and frequency converter 29 are arranged, in the indicated order, to form a feedback loop. This loop provides an automatic phase control circuit which brings the phase of the color burst signal of the carrier chroma signal (the output of the frequency converter 29) into agreement with the phase of the output signal of the reference subcarrier oscillator 32.

Figure 5G:
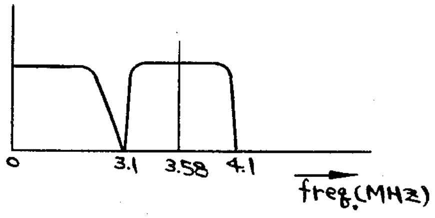

The reproduced carrier chroma signal is thereby converted, at the frequency converter 29, into the original carrier chroma signal having a subcarrier wave of 3.58 $MH_z$. The resulting signal is supplied to a mixer 34 where it is superimposed on the luminance signal from the low-pass filter 27. This superimposition provides a reproduced color video signal of the spectrum shown in FIG. 5G. It should be noted that timing axis variation is thus reduced.

The reason why a variation in the timing axis of the reproduced color video signal is so reduced will be explained next. Basically, a variation in the timing axis of a signal is caused by either a variation in the rate of movement of the magnetic tape or an irregularity in the rotation of the magnetic heads at the time when a carrier chroma signal is converted into a carrier chroma signal having a subcarrier wave of 700 $KH_z$. Let us next examine the reduction in variation of the timing axis, of a carrier chroma signal of 3.58 $MH_z$. The signal is frequency converted into a signal of 700 $KH_z$ for recording and reproducing. Then the returned to a signal of 3.58 $MH_z$ by frequency conversion. The variations of this signal will be compared with variation of the same signal of 3.58 $MH_z$ after recording and reproducing, but without being subjected to these frequency conversions. In the interest of brevity of the explanation, the carrier chroma signal is represented by one frequency signal of its subcarrier frequency.

Assume that the amount of a variation in the timing axis of these carrier chroma signal is ± 1 percent, $$3.58\ MH_z \pm 35.8\ KH_z \text{ (for the 3.58 } MH_z \text{ signal)} \quad (1)$$

$$700\ KH_z \pm 7\ KH_z \text{ (for the 700 } KH_z \text{ signal)} \quad (2)$$

Assume further that the 700 $KH_z$ signal is frequency converted into a 3.58 $MH_z$ signal by the output signal of the stable voltage control oscillator 30 having an oscillation center frequency of 4.3 $MH_z$. The variation contained in this signal will be as follows:

$$4.3\ MH_z - (700\ KH_z \pm 7\ KH_z) \approx 3.6\ MH_z \pm 7\ KH_z \quad (3)$$

A comparison of the formulas (1) and (3) shows that variations are about ± 35 $KH_z$ and about ∓ 7 $KH_z$ respectively. Thus, the latter variation is about one-fifth the former variation. This shows that frequency conversion brings about a reduction of the variation in the timing axis to about one-fifth the original level.

However, the aforementioned automatic phase control circuit will make an error in operation if the frequency of the color burst signal is too far off synchronization. The carrier chroma signal which is frequency converted at the frequency converter 29 by the oscillation center frequency $f_0$ of the voltage control oscillator 30 must be near the frequency (≈ 3.579545 $MH_z$ ± 10 $H_z$) of the output signal of the reference subcarrier oscillator 32. Generally, a simple type video tape recorder has no capstan servo-mechanism. Thus the frequency of the color burst signal of the reproduced carrier chroma signal often fluctuates by over ± 0.2 percent.

Figure 3:
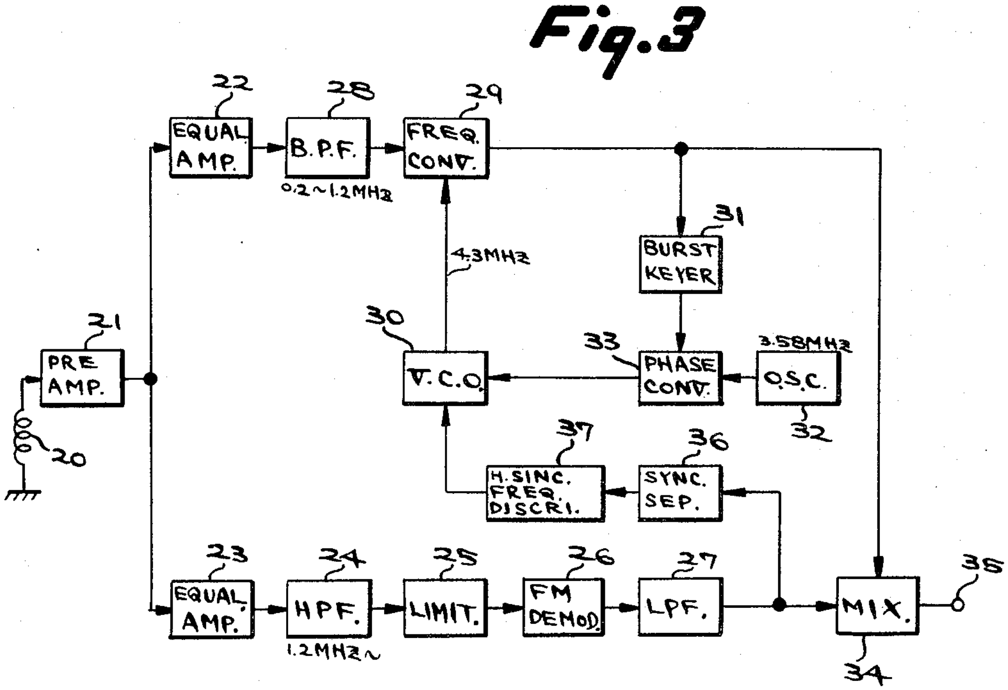
FIG. 3 is a block diagram of a second embodiment of the reproducing side of a system constructed according to this invention.

Next to be described in another aspect of the present invention shown in FIG. 3. The explanation of the parts in FIG. 3, which are designated by the same reference numerals are used in FIG. 2, is omitted.

The synchronizing signal is separated at a synchronizing signal separator 36 (FIG. 3). Separation is from the luminance signal which is the output signal of the low-pass filter 27. The separated signal is then supplied to a horizontal synchronizing signal discriminator 37. There a discrimination of the frequency of the horizontal synchronizing signal is effected.

The horizontal synchronizing signal and carrier chroma signal are subjected to the same amount of variation in the timing axis. Thus, the output voltage of the frequency discriminator 37 has a variation which is proportional to the variation in the subcarrier frequency of the reproduced carrier chroma signal. The output voltage of the frequency discriminator 37 is used to control the oscillation center frequency of the voltage control oscillator 30. Accordingly, it is possible to reduce the variation in the timing axis to below ± 0.2 percent.

The frequency discriminator 37 for the voltage control oscillator 30 by its output. This control enables the aforementioned automatic phase control circuit to operate in a stable manner even though the subcarrier frequency of the reproduced carrier chroma signal shows a variation in the timing axis of about ± 0.2 percent. Thus, the present invention makes it possible to stabilize the phase of the reproduced carrier chroma signal when the rate of movement of the magnetic tape has a large fluctuation. It is to be understood that the system according to this invention can perform a similar function even if the frequency discriminator 37 for the horizontal synchronizing signal is replaced by a frequency discriminator for the color burst signal.

The present invention removes a large variation in the timing axis of the reproduced carrier chroma signal. The explanation of the parts in FIG. 3 which are designated by the same reference numerals as used in FIG. 2 is omitted.

Figure 4:
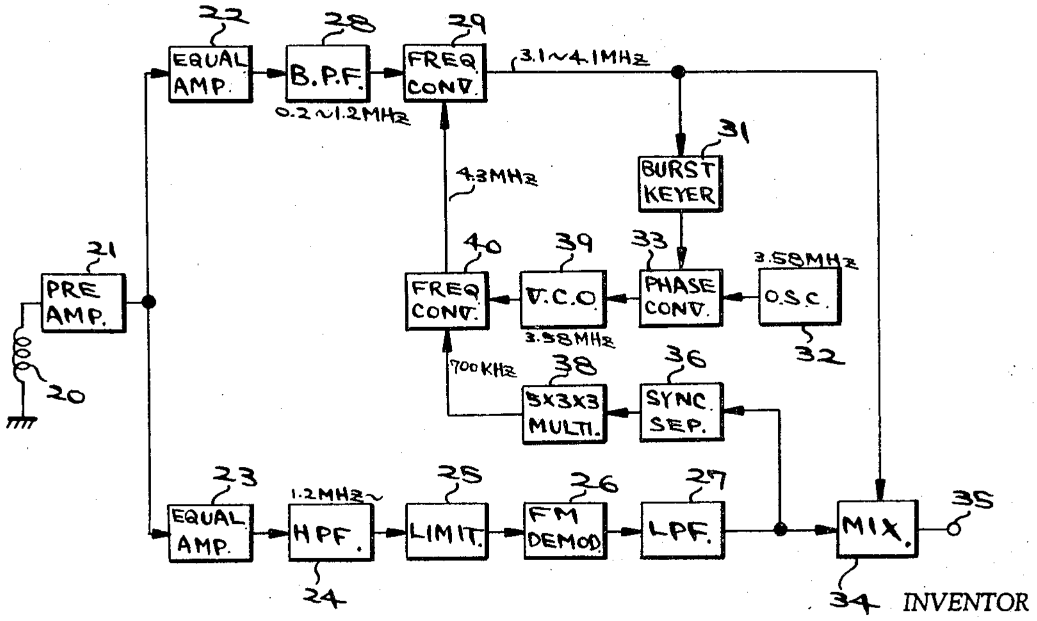
FIG. 4 is a block diagram of a third embodiment of the reproducing side of a system constructed according to this invention.

A third embodiment of the reproducing side of a system constructed according to this invention will be explained with reference to FIG. 4. In FIG. 4, like reference characters designate parts similar to those shown in FIGS. 2 and 3, and the explanation of such parts is omitted.

In this embodiment, the oscillation center frequency of the voltage control oscillator 30 is not directly controlled by the output of the phase comparator 33 as in the embodiments shown in FIGS. 2 and 3; it is indirectly controlled thereby. More specifically, a multiplier circuit 38 provides the basic component of the horizontal synchronizing signal. This signal multiplies the basic component of the horizontal synchronizing signal by 5 × 3 × 3, to become substantially 700 $KH_z$. This frequency lies in the neighborhood of the color subcarrier frequency. This frequency is near the subcarrier frequency of the reproduced carrier chroma signal. Also, this multiplied signal has a frequency variation which is substantially equal to the frequency variation in the reproduced carrier chroma signal. A voltage control oscillator 39 has an oscillation center frequency of about 3.58 $MH_z$, which is controlled by the output of the phase comparator 33. 40 is a frequency converter 40 converts the output signal from about 700 $KH_z$ of the multiplier circuit 38 by the output signal of the voltage control oscillator 39. This produces an output signal of 4.3 $MH_z$ which is used to frequency convert the reproduced carrier chroma signal at the frequency converter 29. In this embodiment, the feedback loop comprises the frequency converter 29, color burst keyer 31, phase comparator 33, voltage control oscillator 39, frequency converter 40 and frequency converter 29. This feedback loop constitutes an automatic phase control circuit for removing a variation in the timing axis. The frequency converter 40 produces an output signal having a frequency which corresponds to the oscillation frequency of the voltage control oscillator 39, plus about 700 $KH_z$. There is a frequency variation approximately equal to that of the subcarrier frequency of the reproduced carrier chroma signal. Thus, the frequency converter 40 has substantially the same effect as the control of center oscillation frequency of the voltage control oscillator 39. It will be understood that this embodiment stabilizes the phase of the reproduced carrier chroma signal having a large timing axis variation.

From the foregoing description, it will be appreciated that the system according to this invention offers many advantages. The carrier chroma signal is not passed through the frequency modulation system and frequency demodulation system for the low-band carrier. Therefore, the system is free from the danger of producing beats, which are characteristic of the low-band carrier wave FM system. It is possible to correct large timing axis variation of the reproduced carrier chroma signal. Moreover, the system has very little differential gain and differential phase because the carrier chroma signal and luminance signal are separated from each other.

While the present invention has been described with reference to preferred embodiments, it is to be understood that the invention is not limited thereto, and that many changes and modifications may be made therein. Thus the appended claims are intended as covering all equivalents falling within the true spirit and scope of the invention.

What is claimed is:

1. A color video signal recording and reproducing system comprising first filter means for separating a luminance signal from a color video signal, means for frequency modulating said luminance signal, second filter means for separating a carrier chroma signal from said color video signal prior to the modulation of said luminance signal, first non-modulating frequency converter means for converting the unmodulated frequency band of said carrier chroma signal to a frequency band which is lower than frequencies occupied by the frequency modulated luminance signal, means for superimposing the luminance signal output of said frequency modulator means and the chroma signal output of said non-modulating frequency converter means one on the other, means for recording and reproducing the superimposed signal on a magnetic medium, third filter means for separating a frequency modulated luminance signal from a signal reproduced by said recording and reproducing means, means for demodulating said luminance signal, fourth filter means for separating the frequency converted carrier chroma signal from said signal reproduced from said medium, second frequency converter means for restoring the frequency band of said filtered carrier chroma signal to the original frequency band, means comprising a color burst keyer for keying a color burst signal from the output signal of said second frequency converter means, oscillator means for producing a reference subcarrier signal, means for comparing the phase of said color burst signal with the phase of the output signal of said oscillator means and producing an error signal corresponding to the phase difference between both signals, and means including a voltage control oscillator having a center frequency of oscillation which is controlled by said error signal for supplying an output to said frequency converter means whereby it constitutes a feedback loop together with said color burst keyer and said phase comparator means.

2. A color video signal recording and reproducing system as defined in claim 1 comprising means for controlling the center frequency of oscillation of said voltage control oscillator means responsive to a horizontal synchronizing signal separated from said reproduced signal.

3. A color video signal recording and reproducing system as defined in claim 1 comprising means for separating a horizontal synchronizing signal from said reproduced signal, frequency discriminator means for discriminating the frequency of the horizontal synchronizing signal separated by said separator means, and means for controlling the center frequency of oscillation of said voltage control oscillator means responsive to the output voltage of said frequency discriminator means together with said error signal, said center frequency of oscillation having a frequency variation which is proportional to the frequency variation of the subcarrier of the reproduced carrier chroma signal.

4. A color video signal recording and reproducing system comprising first filter means for separating a luminance signal from a color video signal, means for frequency modulating said luminance signal, second filter means for separating a carrier chroma signal from said color video signal, first non-modulating frequency converter means for converting the frequency band of said carrier chroma signal to a frequency band which is lower than frequencies occupied by the frequency modulated luminance signal, means for superimposing the output of said frequency modulator means and the output of said non-modulating frequency converter means one on the other, means for recording and reproducing the superimposed output signal on a magnetic medium, third filter means for separating a frequency modulated luminance signal from a signal reproduced from said magnetic medium, means for demodulating said luminance signal, fourth filter means for separating the frequency converted carrier chroma signal from said signal reproduced from said magnetic medium, second frequency converter means for restoring the frequency band of said filtered carrier chroma signal to the original frequency band, means comprising a color burst keyer for keying a color burst signal responsive to the output signal of said second frequency converter means, oscillator means for producing a reference subcarrier signal, means for comparing the phase of said color burst signal with the phase of the output signal of said oscillator means and producing an error signal corresponding to the phase difference between both signals, voltage control oscillator means having a center frequency of oscillation which is controlled responsive to said error signal, means for separating a horizontal synchronizing signal from said reproduced signal, multiplier means for multiplying the frequency of the basic wave component of said horizontal synchronizing signal to a frequency near the subcarrier frequency of the converted carrier chroma signal, and third frequency converter means for frequency converting the output signal of said multiplier means responsive to the output of said voltage control oscillator means and for providing an output signal which is supplied to said second frequency converter means, thereby constituting a feedback loop together with said color burst keyer and said phase comparator means.

5. A color video signal recording and reproducing system as defined in claim 1 in which said color video signal is an NTSC color video signal.

* * * * *